(12) United States Patent
Joshi et al.

(10) Patent No.: US 11,933,247 B2
(45) Date of Patent: Mar. 19, 2024

(54) THRUST REVERSER SYSTEM LATCH ASSEMBLY AND METHOD OF OPERATING SAME

(71) Applicant: Rohr, Inc., Chula Vista, CA (US)

(72) Inventors: Prafull Joshi, Bengaluru (IN); Srikanth Perumandla, Bangalore (IN)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/869,488

(22) Filed: Jul. 20, 2022

(65) Prior Publication Data

US 2023/0021890 A1 Jan. 26, 2023

(30) Foreign Application Priority Data

Jul. 20, 2021 (IN) .............................. 202111032614

(51) Int. Cl.
*F02K 1/76* (2006.01)
*B64D 29/06* (2006.01)
*B64D 29/08* (2006.01)

(52) U.S. Cl.
CPC .............. *F02K 1/766* (2013.01); *B64D 29/06* (2013.01); *B64D 29/08* (2013.01); *F05D 2220/323* (2013.01); *F05D 2260/30* (2013.01); *Y10T 292/0886* (2015.04)

(58) Field of Classification Search
CPC ......... F02K 1/766; B64D 29/06; B64D 29/08; Y10T 292/0814; Y10T 292/0816; Y10T 292/0818; Y10T 292/0886; Y10T 292/0892; Y10T 292/0876; Y10T 292/0877; Y10T 403/46; Y10T 403/4648; E05B 63/12; E05B 63/122; E05B 63/126
See application file for complete search history.

(56) References Cited

U.S. PATENT DOCUMENTS

| 4,058,331 A | 11/1977 | Koonce |
| 4,679,750 A | 7/1987 | Burhans |
| 6,000,732 A * | 12/1999 | Scheler ............. H01L 21/67373 292/6 |

(Continued)

FOREIGN PATENT DOCUMENTS

EP    1764499 B1    12/2017

OTHER PUBLICATIONS

EP search report for EP22186081.0 dated Dec. 15, 2022.

*Primary Examiner* — Andrew H Nguyen
(74) *Attorney, Agent, or Firm* — Getz Balich LLC (57) ABSTRACT

A latch assembly includes a housing including a first housing portion and a second portion including. The latch assembly further includes a first latch member disposed within the first housing portion and configured for translation along the latch axis. The first latch member includes at least two rotatable arms configured to rotate between an arm retracted position and an arm extended position in which the at least two rotatable arms extend in a first direction away from the latch axis. The latch assembly further includes a second latch member disposed within the second housing portion and configured for translation along the latch axis. The second latch member includes a second latch member body including a base portion and at least one axially extending portion extending from the base portion in a second direction toward the interior surface of the lateral wall.

14 Claims, 7 Drawing Sheets

(56) References Cited

U.S. PATENT DOCUMENTS

| | | |
|---|---|---|
| 6,629,712 B2 | 10/2003 | Jackson |
| 10,309,126 B2 | 6/2019 | Do |
| 2008/0098720 A1 | 5/2008 | Watson |
| 2013/0220435 A1 | 8/2013 | James |
| 2016/0053719 A1 | 2/2016 | Pretty |
| 2017/0226776 A1* | 8/2017 | Nicoara ................ E05B 15/102 |
| 2017/0226961 A1 | 8/2017 | Smith |
| 2020/0102909 A1* | 4/2020 | Kopecek ............. E05B 47/0603 |

* cited by examiner

THRUST REVERSER SYSTEM LATCH ASSEMBLY AND METHOD OF OPERATING SAME

This application claims priority to Indian Patent Appln. No. 202111032614 filed Jul. 20, 2021 which is hereby incorporated herein by reference in its entirety.

BACKGROUND

1. Technical Field

This disclosure relates generally to gas turbine engines, and more particularly to latch assemblies for gas turbine engine thrust reversers.

2. Background Information

Modern aircraft may include one or more propulsion systems powered by a gas turbine engine. The propulsion systems may include a nacelle which houses the engine and auxiliary systems, and which provides an aerodynamic surface for flight. The nacelle may also form a portion of a bypass air duct between the nacelle and the engine. In some cases, the nacelle may include a thrust reverser (e.g., a cascade-type thrust reverser) which may include an inner fixed structure ("IFS"). The IFS may form part of the interior surface of the bypass air duct through the thrust reverser and may define a core compartment that surrounds the engine.

A thrust reverser IFS structure may be divided into panel halves which may be held together by remote latch assemblies. Bumpers may additionally be included between the panel halves to provide a load path for hoop compression experienced by the panel halves. In some thrust reversers, the latch assemblies may have a pin-and-socket configuration in which a pin is engaged with an opposing socket in order to place the latch assembly in a latched condition. However, pin-and-socket type latch assemblies may be susceptible to jamming between the pin and associated socket, thereby causing difficulty in the unlatching of the latch assembly during maintenance of the associated gas turbine engine. Accordingly, there is a need for improved thrust reverser latch assemblies.

SUMMARY

It should be understood that any or all of the features or embodiments described herein can be used or combined in any combination with each and every other feature or embodiment described herein unless expressly noted otherwise.

According to an aspect of the present disclosure, a latch assembly includes a housing including a first housing portion including a first aperture and a second portion including a second aperture. Each of the first aperture and the second aperture extend along a latch axis. The second housing portion includes a lateral wall defining the second aperture. The lateral wall includes an exterior surface facing the first housing portion and an interior surface facing away from the first housing portion. The latch assembly further includes a first latch member disposed within the first housing portion and configured for translation along the latch axis. The first latch member includes at least two rotatable arms configured to rotate between an arm retracted position and an art extended position in which the at least two rotatable arms extend in a first direction away from the latch axis. The latch assembly further includes a second latch member disposed within the second housing portion and configured for translation along the latch axis. The second latch member includes a second latch member body including a base portion and at least one axially extending portion extending from the base portion in a second direction toward the interior surface of the lateral wall. The at least one axially extending portion radially surrounds a recess located along the latch axis.

In any of the aspects or embodiments described above and herein, the first latch member is configured to translate along the latch axis between a first retracted position with the at least two rotatable arms located within the first housing portion and a first extended position with the at least two rotatable arms located within the second housing portion.

In any of the aspects or embodiments described above and herein, the first latch member extends through the first aperture and the second aperture in the first extended position.

In any of the aspects or embodiments described above and herein, with the first latch member in the first extended position and the at least two rotatable arm sin the arm extended position, the second latch member is configured to translate along the latch axis between a second retracted position with the at least one axially extending portion axially spaced from the at least two rotatable arms and a second extended position with the at least two rotatable arms in contact with and fixed between the at least one axially extending portion of the second latch member body and the interior surface of the lateral wall.

In any of the aspects or embodiments described above and herein, the second latch member includes an axially extending spring disposed within the second latch member body. The axially extending spring is configured to axially bias the at least one axially extending portion against the at least two rotatable arms with the second latch member in the second extended position.

In any of the aspects or embodiments described above and herein, the second latch member body includes an axially extending passage and a locking pin disposed within the axially extending passage and configured to translate along the latch axis. The spring is positioned in the axially extending passage axially between the second latch member body and the locking pin.

In any of the aspects or embodiments described above and herein, the second latch member body includes a pin stopped located in the axially extending passage. The pin stoper is configured to obstruct axial translation of the locking pin within the axially extending passage.

In any of the aspects or embodiments described above and herein, the second aperture has a first width substantially perpendicular to the latch axis and the recess has a second width substantially perpendicular to the latch axis which is greater than the first width.

In any of the aspects or embodiments described above and herein, with the at least two rotatable arms in the extended position, the at least two rotatable arms have a third width substantially perpendicular to the latch axis which is greater than the second width.

In any of the aspects or embodiments described above and herein, the first latch member includes a first latch member body including an axially extending passage and the at least two rotatable arms are rotatably fixed to the first latch member body at respective pivot joints located radially outside of the axially extending passage.

In any of the aspects or embodiments described above and herein, the first latch member includes an actuating rod disposed within the axially extending passage and configured to translate along the latch axis. The actuating rod is connected to each rotatable arm of the at least two rotatable arms with at least one connector rotatably mounted to the actuating rod at a first connector end and rotatably mounted to each respective rotatable arm of the at least two rotatable arms at a second connector end.

In any of the aspects or embodiments described above and herein, the at least one axially extending portion includes at least two axially extending portions. Each axially extending portion of the at least two axially extending portions is circumferentially aligned with each respective rotatable arm of the at least two rotatable arms.

According to another aspect of the present disclosure, a thrust reverser system for a gas turbine engine includes a pylon and a first panel half and a second panel half. Each of the first panel half and the second panel half are rotatably mounted to the pylon. The thrust reverser system further includes at least one latch assembly configured to secure the first panel half and the second panel half in a closed condition. The at least one latch assembly includes a housing including a first housing portion mounted to the first panel half and including a first aperture and a second housing portion mounted to the second panel half and including a second aperture. Each of the first aperture and the second aperture extend along a latch axis. The second housing portion includes a lateral wall defining the second aperture. The lateral wall includes an exterior surface facing the first housing portion and an interior surface facing away from the first housing portion. The at least one latch assembly further includes a first latch member disposed within the first housing portion and configured for translation along the latch axis. The first latch member includes at least two rotatable arms configured to rotate between an arm retracted position and an arm extended position in which the at least two rotatable arms extend in a first direction away from the latch axis. The at least one latch assembly further includes a second latch member disposed within the second housing portion and configured for translation along the latch axis. The second latch member includes a second latch member body including a base portion and at least one axially extending portion extending from the base portion in a second direction toward the interior surface of the lateral wall. The at least one axially extending portion radially surrounds a recess located along the latch axis.

According to another aspect of the present disclosure, a method for operating a latch assembly is provided. A first latch member is translated along a latch axis from a first retracted position to a first extended position. With the first latch member in the first extended position, at least two rotatable arms of the first latch member are rotated from an arm retracted position to an arm extended position in which the at least two rotatable arms extend in a first direction away from the latch axis. A second latch member is translated along the latch axis from a second retracted position with the second latch member axially spaced from the at least two rotatable arms in the arm extended position to a second extended position with the at least two rotatable arms in contact with and fixed between the second latch member and a lateral wall through which the firs latch member extends along the latch axis.

In any of the aspects or embodiments described above and herein, the step of rotating the at least two arms from the arm retracted position to the arm extended position includes translating an actuating rod along the latch axis. The actuating rod is connected to each rotatable arm of the at least two rotatable arms with at least one connector rotatably mounted to the actuating rod at a first connector end and rotatably mounted to each respective rotatable arm of the at least two rotatable arms at a second connector end.

In any of the aspects or embodiments described above and herein, the second latch member includes a spring disposed within a second latch member body of the second latch member. The spring is configured to axially bias the second latch member against the at least two rotatable arms with the second latch member in the second extended position.

In any of the aspects or embodiments described above and herein, the second latch member body includes an axially extending passage and a locking pin disposed within the axially extending passage and configured to translate along the latch axis. The spring is positioned in the axially extending passage axially between the second latch member body and the locking pin.

In any of the aspects or embodiments described above and herein, the second latch member body includes a pin stopper located in the axially extending passage. The pin stopper is configured to obstruct axial translation of the locking pin within the axially extending passage.

In any of the aspects or embodiments described above and herein, the method further includes locking the axial position of the second latch member by rotating the locking pin about the latch axis while the locking pin is in contact with the pin stopper.

The present disclosure, and all its aspects, embodiments and advantages associated therewith will become more readily apparent in view of the detailed description provided below, including the accompanying drawings.

DETAILED DESCRIPTION

Figure 1:
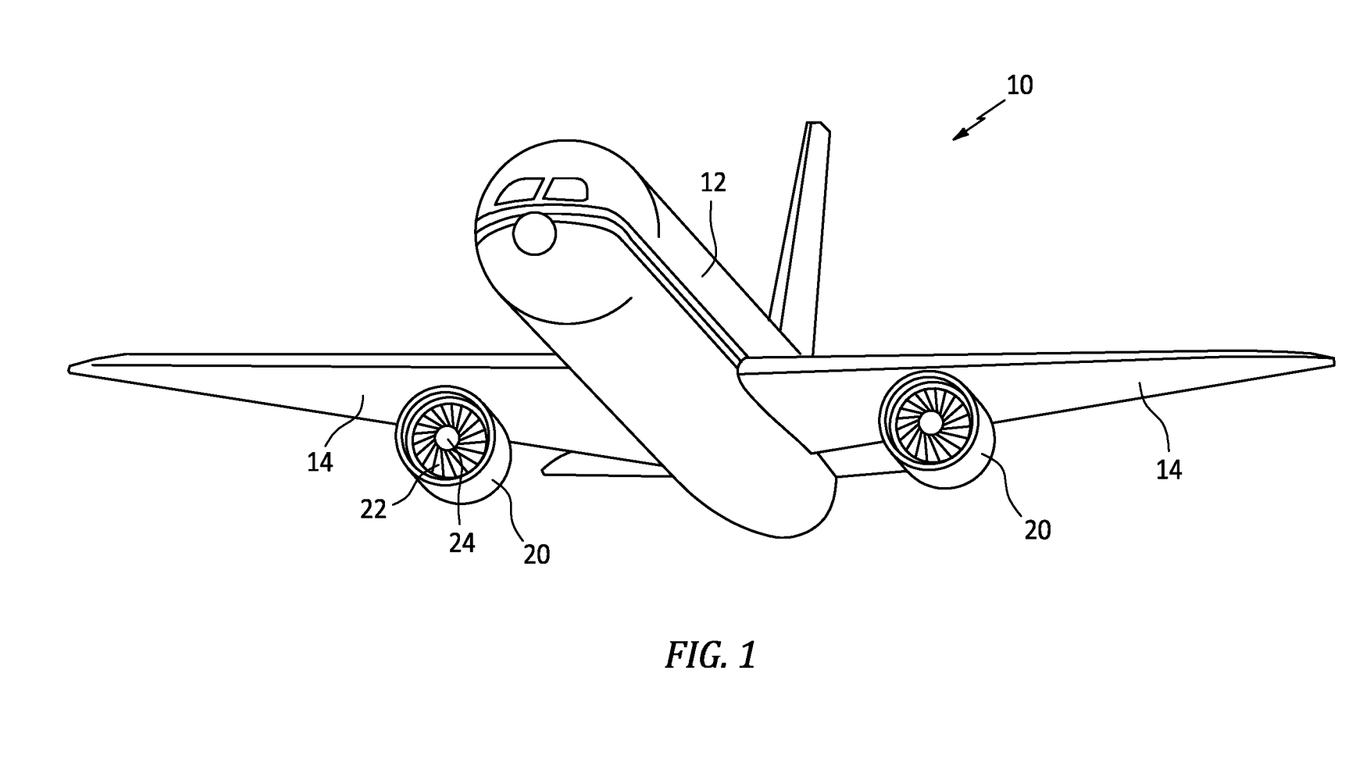
FIG. 1 illustrates a perspective view of an aircraft, in accordance with one or more embodiments of the present disclosure.
Figure 2:
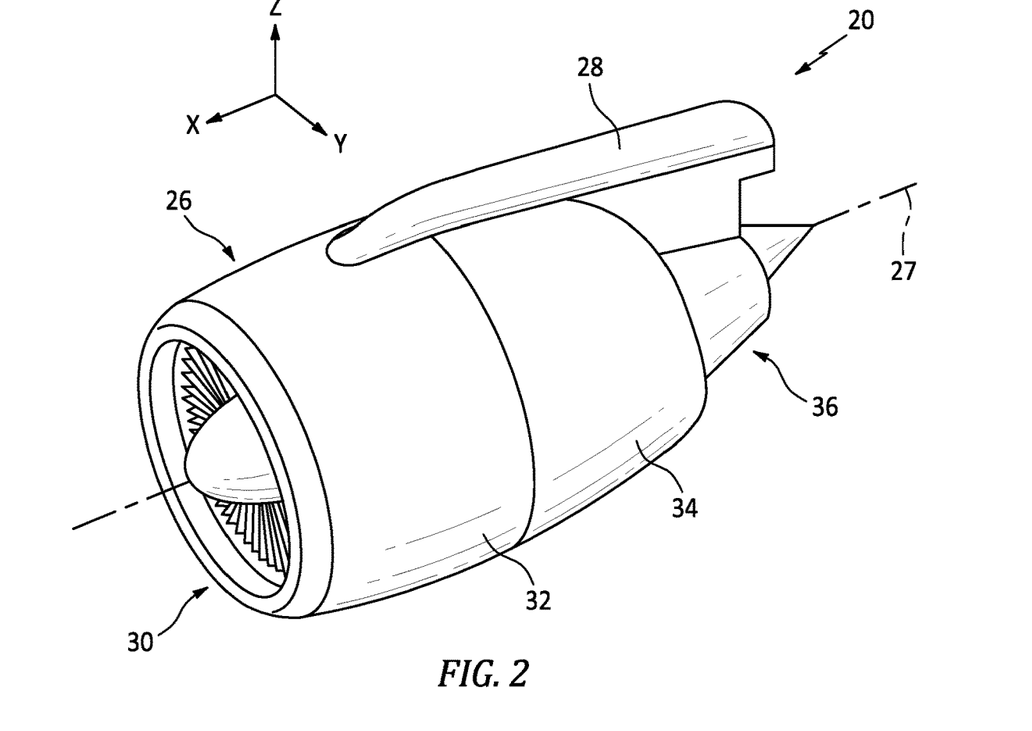
FIG. 2 illustrates a perspective view of a gas turbine engine including a thrust reverser, in accordance with one or more embodiments of the present disclosure.
Figure 3:
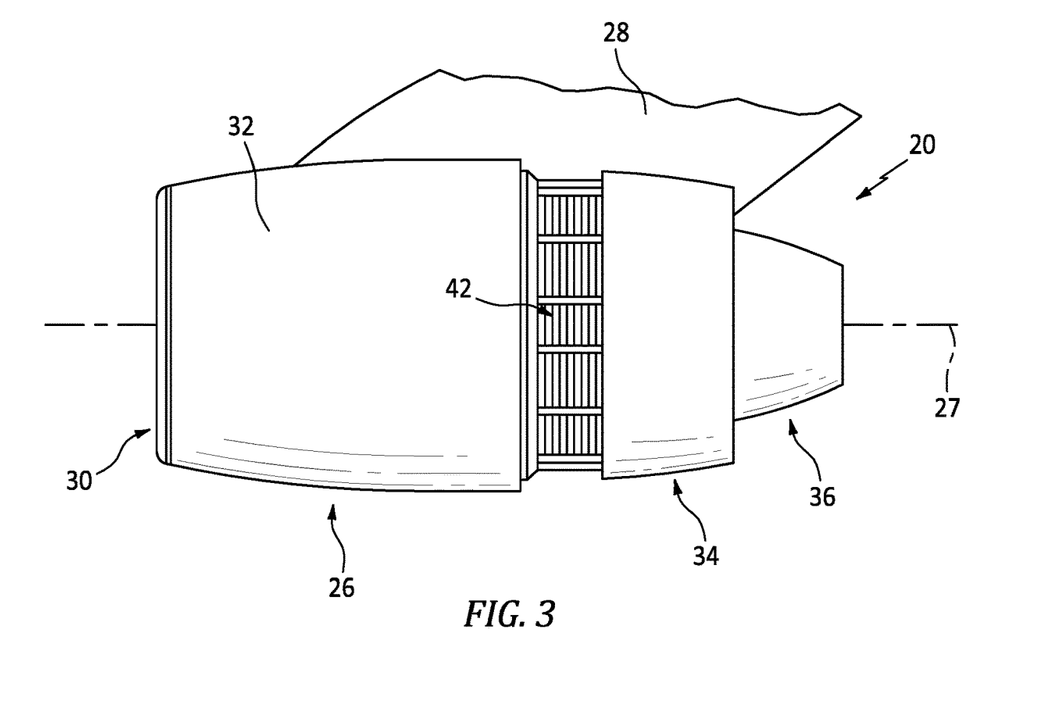
FIG. 3 illustrates a side view of the gas turbine engine of FIG. 2 with a translating sleeve of the thrust reverser in an aft position, in accordance with one or more embodiments of the present disclosure.

Referring to FIGS. 1-3, a perspective view of an aircraft 10 is shown in FIG. 1. The aircraft 10 includes a fuselage 12 and wings 14 which extend outwardly from the fuselage 12. The aircraft 10 may include one or more propulsion systems which may be supported, for example, by the wings 14 of the aircraft 10. The propulsion systems may include a gas turbine engine such as the gas turbine engine 20 illustrated in FIGS. 1-3.

The gas turbine engine 20 includes a fan 22 and an engine core 24 housed within a nacelle 26 and disposed about an axial centerline 27. The nacelle 26 is mounted to a pylon 28 which may, for example, mount the gas turbine engine 20 to the wing 14 of the aircraft 10. The nacelle 26 may include an inlet 30, a fan cowl 32, a thrust reverser system 34, and an exhaust system 36. The nacelle surrounds the engine core 24 providing smooth aerodynamic surfaces for airflow around and into the gas turbine engine 20. The nacelle 26 also defines a portion of a bypass air duct through the gas turbine engine 20.

In various embodiments, the fan 22 may draw and direct a flow of air into and through the gas turbine engine 20. After the fan 22, the air is divided into two principal flow paths, one flow path through engine core 24 (i.e., a "core airflow"), and another flow path through a bypass air duct (i.e., a "bypass airflow"). The engine core flow path is directed into the engine core 24 and initially passes through a compressor that increases the air flow pressure, and then through a combustor where the air is mixed with fuel and ignited. The combustion of the fuel and air mixture causes a series of turbine blades at the rear of the engine core 24 to rotate, and to drive the engine's compressor and fan 22. The high-pressure exhaust gases from the combustion of the fuel and air mixture are thereafter directed through the exhaust system 36 for thrust.

Referring to FIGS. 2-5, the thrust reverser system 34 may include an inner fixed structure 38 ("IFS") and a translating sleeve 40. The translating sleeve 40 in combination with an air diversion system (e.g., blocker doors, diversion doors, etc. —not shown) may be configured to direct airflow in the bypass duct through one or more cascade arrays 42 to create reverse thrust. The translating sleeve 40 may translate and/or move from a forward position (see FIG. 2) to an aft position (see FIG. 3), thereby separating the translating sleeve 40 from the fan cowl 32. The aft movement of the translating sleeve 40 and operation of the air diversion system causes air to be diverted from the bypass duct through the cascade arrays 38 and in a forward direction to create reverse thrust.

Figure 4:
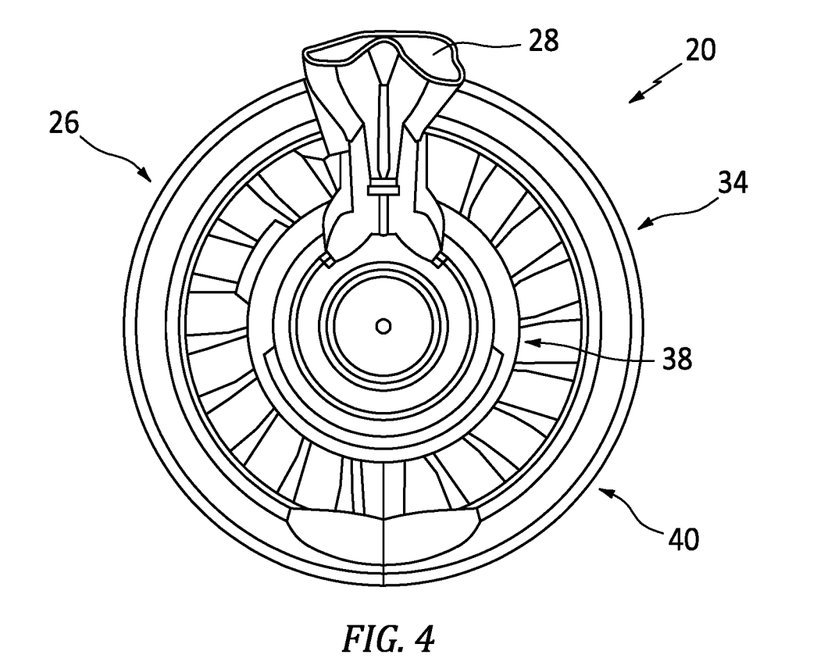
FIG. 4 illustrates a rear, cross-sectional view of the gas turbine engine of FIG. 2 including first and second panel halves of the thrust reverser in a closed condition, in accordance with one or more embodiments of the present disclosure.
Figure 5:
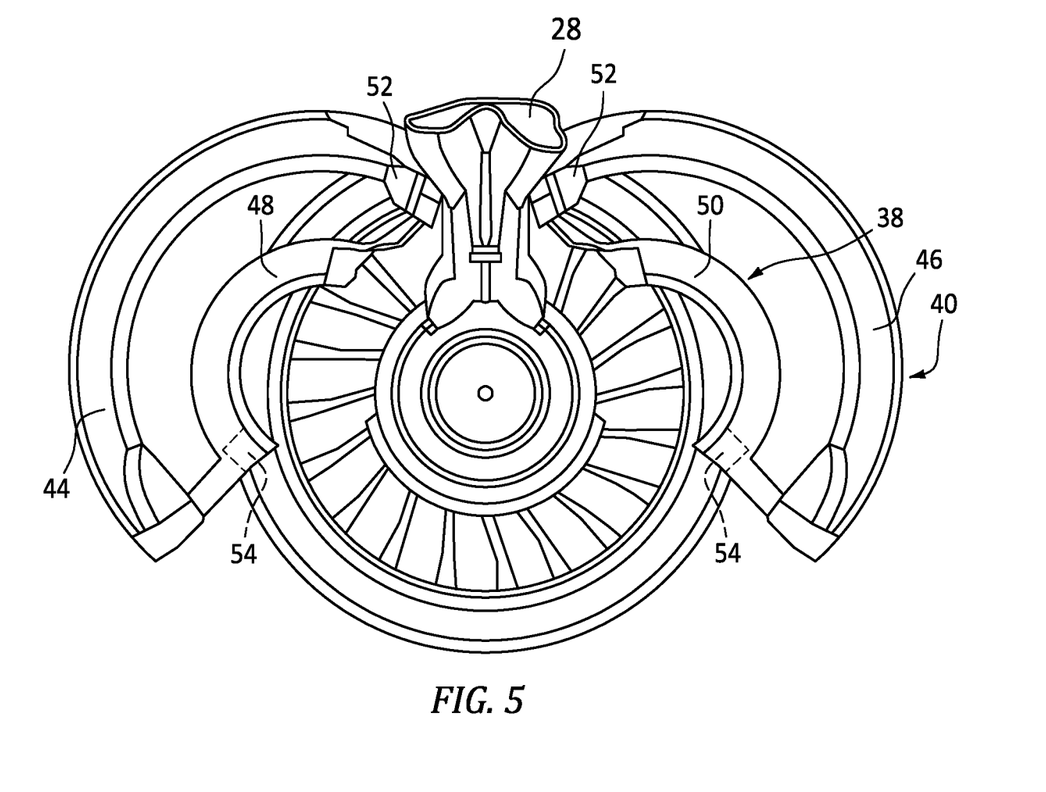
FIG. 5 illustrates a rear, cross-sectional view of the gas turbine engine of FIG. 2 with the first and second panel halves of the thrust reverser in an open condition, in accordance with one or more embodiments of the present disclosure.

Referring to FIGS. 4 and 5, an aft view of the thrust reverser system 34 in a closed condition is shown in FIG. 4 while an aft view of the thrust reverser system 34 in an open condition is shown in FIG. 5. The thrust reverser system 34 may be split into halves, for example, a left outer panel half 44 and counterpart right outer panel half 46 of the translating sleeve 40 and a left inner panel half 48 and counterpart right inner panel half 50 of the inner fixed structure 38. The outer panel halves 44, 46 and the inner panel halves 48, 50 may be hinged to the pylon 28 at hinges 52 and may be hinged open in order to provide access to interior portions of the gas turbine engine 20 such as the engine core 24. As used herein, the term "closed condition" will be used to refer to the panel halves 44, 46, 48, 50 in a fully shut position (e.g., the panel halves 44, 46, 48, 50 are positioned for flight). The term "open condition" will be used to refer to the panel halves 44, 46, 48, 50 in a condition other than the closed condition (e.g., the panel halves 44, 46, 48, 50 are partially open, fully open, etc.).

Figure 6:
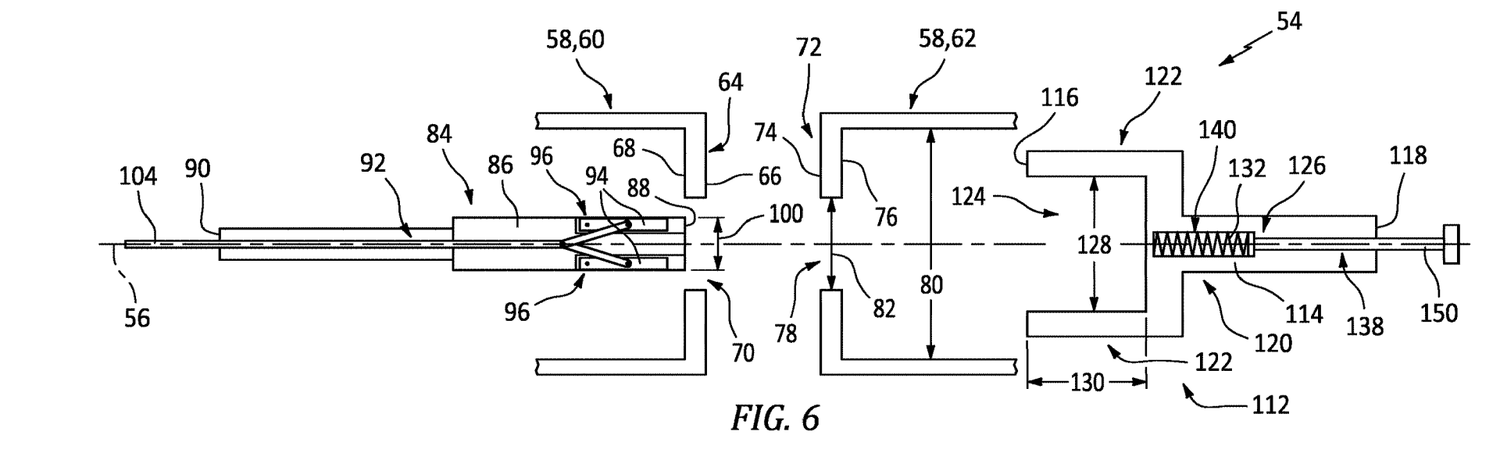
FIG. 6 illustrates a view of a thrust reverser latch assembly in a fully unlatched condition, in accordance with one or more embodiments of the present disclosure.
Figure 7:
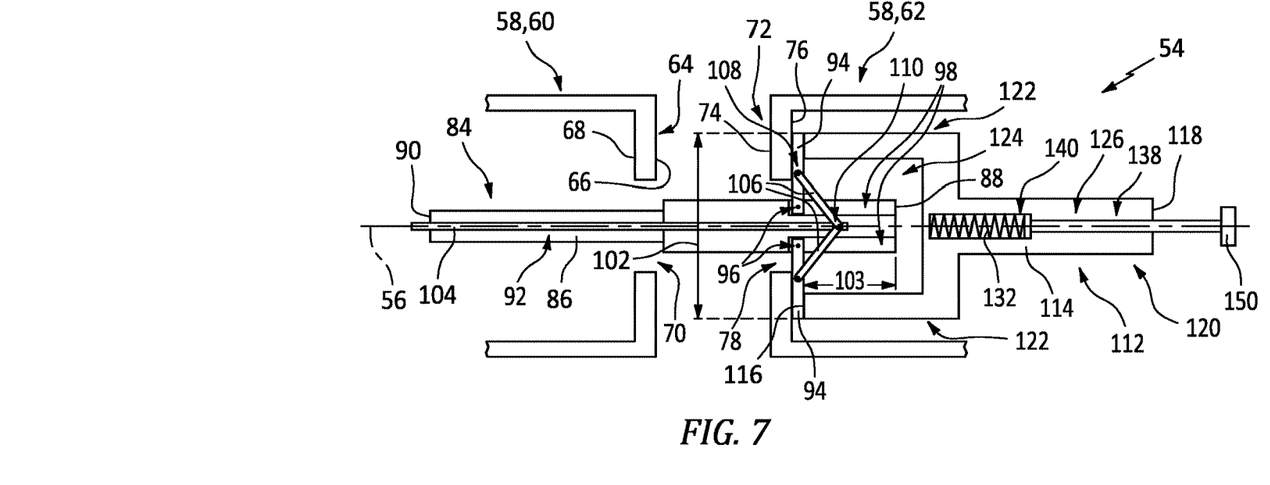
FIG. 7 illustrates a view of the thrust reverser latch assembly of FIG. 6 in a fully latched condition, in accordance with one or more embodiments of the present disclosure.

Referring to FIGS. 4-7, the inner fixed structure 38 of the thrust reverser system 34 includes one or more remotely actuated latch assemblies 54 configured to secure the left inner panel half 48 and the right inner panel half 50 (hereinafter the "first panel half" 48 and the "second panel half" 50) together in a closed condition. The latch assembly 54 may be operated by an actuation system (not shown), however, the present disclosure is not limited to any particular actuation system or means for operating the latch assembly 54. FIGS. 6 and 7 illustrate the configuration of the latch assembly 54 with respect to a latch axis 56, with the first panel half 48 and the second panel half 50 in a closed condition.

Referring to FIGS. 6 and 7, the latch assembly 54 includes a housing 58. The housing 58 includes a first housing portion 60 mounted to the first panel half 48 and a second housing portion 62 mounted to the second panel half 50. The first housing portion 60 may include a lateral wall 64 having an exterior surface 66 which faces the second housing portion 62 with the panel halves 48, 50 in a closed condition, and an interior surface 68 opposite the exterior surface 66. The first housing portion 60 may further include an aperture 70 extending along the latch axis 56 from the interior surface 68 to the exterior surface 66. Similarly, the second housing portion 62 may include a lateral wall 72 having an exterior surface 74 which faces the first housing portion 60 with the panel halves 48, 50 in a closed condition, and an interior surface 76 opposite the exterior surface 74. The second housing portion 62 may further include an aperture 78 extending along the latch axis 56 from the interior surface 76 to the exterior surface 74. The second housing portion 62 has an interior width 80 substantially perpendicular to the latch axis 56. The aperture 78 has an aperture width 82 substantially perpendicular to the latch axis 56.

The latch assembly 54 includes a first latch member 84 disposed within the first housing portion 60. The first latch member 84 is configured to translate or otherwise move along the latch axis 56 between a retracted position (see FIG. 6) and an extended position (see FIG. 7). The first latch member 84 includes a body 86 having a first end 88 and a second end 90 opposite the first end 88. In various embodiments, the body 86 includes an axially extending passage 92 extending through all or at least a portion of the body 86 from the second end 90 toward the first end 88.

The first latch member 84 includes at least two rotatable arms 94. Each of the rotatable arms 94 is rotatably attached to the body 86 at respective rotation joints 96. The rotatable arms 94 are configured to rotate about the respective rotation joints 96, located radially outside of the passage 92, between a retracted position (see FIG. 6) and an extended position (see FIG. 7). In the retracted position, the rotatable arms 94 are positioned within the body 86, for example, within a recess 98 of the body 86, or are otherwise positioned to extend along the body 86. In the extended position, the rotatable arms 94 extend outward from the body 86 in a direction away from the latch axis 56. For example, in the extended position, the rotatable arms 94 may extend in a direction substantially perpendicular to the latch axis 56. With the rotatable arms 94 in the retracted position, the first latch member 84, including the rotatable arms 94, has a minimum width 100 substantially perpendicular to the latch axis 56. The minimum width 100 may be less than the aperture width 82. With the rotatable arms 94 in the extended position, the rotatable arms 94, and hence the first latch member 84, has a maximum width 102 substantially perpendicular to the latch axis 56. The maximum width 102 may be greater than the aperture width 82 but less than the interior width 80. Accordingly, with the rotatable arms 94 in the extended position, the rotatable arms 94 may radially overlap the interior surface 76 of the lateral wall 72. With the rotatable arms 94 in the extended position, the body 86 has a length 103 extending from the rotatable arms 94 to the first end 88 substantially parallel to the latch axis 56.

In various embodiments, the first latch member 84 may include an actuation rod 104 configured to rotate the rotatable arms 94 between the retracted and extended positions. The actuation rod 104 may be disposed within the passage 92 and extend outward from the body 86 at the second end 90. The actuation rod 104 may be configured to translate or otherwise move along the latch axis 56 within the passage 92. Accordingly, the actuation rod 104 may be translated (e.g., axially translated) to rotate the rotatable arms 94 from the retracted position to the extended position or from the extended position to the retracted position. The actuation rod 104 may be connected to each of the rotatable arms 94 by at least one connector 106 rotatably mounted to the actuating rod 104 at a first connector end 108 and rotatably mounted to each respective rotatable arm 94 at a second connector end 110. The present disclosure is not limited to the above-described configuration of the actuation rod 104 to rotate the rotatable arms 94 between the retracted and extended positions, and operation of the rotatable arms 94 may be effected by other means.

The latch assembly 54 includes a second latch member 112 disposed within the second housing portion 62. The second latch member 112 is configured to translate or otherwise move along the latch axis 56 between a retracted position (see FIG. 6) and an extended position (see FIG. 7). The second latch member 112 includes a body 114 having a first end 116 and a second end 118 opposite the first end 116. The body 114 includes a base portion 120 and at least one axially extending portion 122 extending from the base portion 120 toward the interior surface 76 of the lateral wall 72. The at least one axially extending portion 122 radially surrounds and defines a recess 124 located along the latch axis 56. In various embodiments, the at least one axially extending portion 122 may include at least two axially extending portions with each of the at least two axially extending portions being circumferentially aligned with a respective rotatable arm of the rotatable arms 94. However, the present disclosure is not limited to this particular configuration of the at least one axially extending portion 122. The recess 124 of the second latch member 112 has a recess width 128 substantially perpendicular to the latch axis 56. The recess width 128 may be greater than the aperture width 82 and the minimum width 100. The recess width 128 may be less than the maximum width 102. The recess 124 of the second latch member 112 also has a recess depth 130 between the first end 116 and the base portion 120, which may be substantially parallel to the latch axis 56. The recess depth 130 may be greater than the length 103.

Referring to FIGS. 6, 7, and 8A-B, in various embodiments, the body 114 includes an axially extending passage 126 extending through a portion of the body 114 from the second end 118 of the body 114 toward the first end 116 of the body 114. The passage 126 may include a first passage segment 138 extending from the second end 118 and a second passage segment 140 extending from the first passage segment 138 toward the first end 116. In various embodiments, the second passage segment 140 may have a diameter 142 that is greater than a diameter 144 of the first passage segment 138. The second passage segment 140 may extend from a first axial segment end 146 to a second axial segment end 148 at the location where the second passage segment 140 meets the first passage segment 138.

Figure 8A:
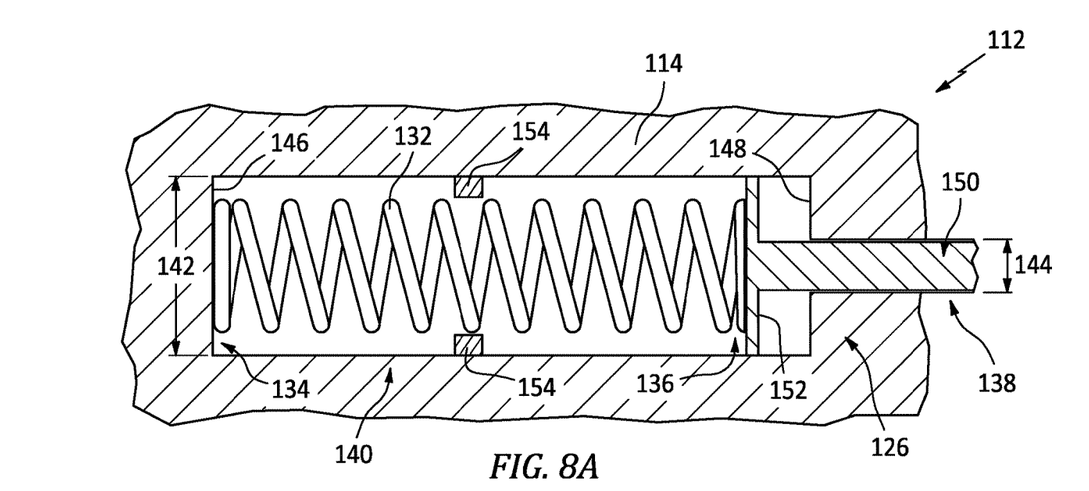
FIGS. 8A-B illustrate a portion of the thrust reverser latch assembly of FIG. 6, in accordance with one or more embodiments of the present disclosure.
Figure 8B:
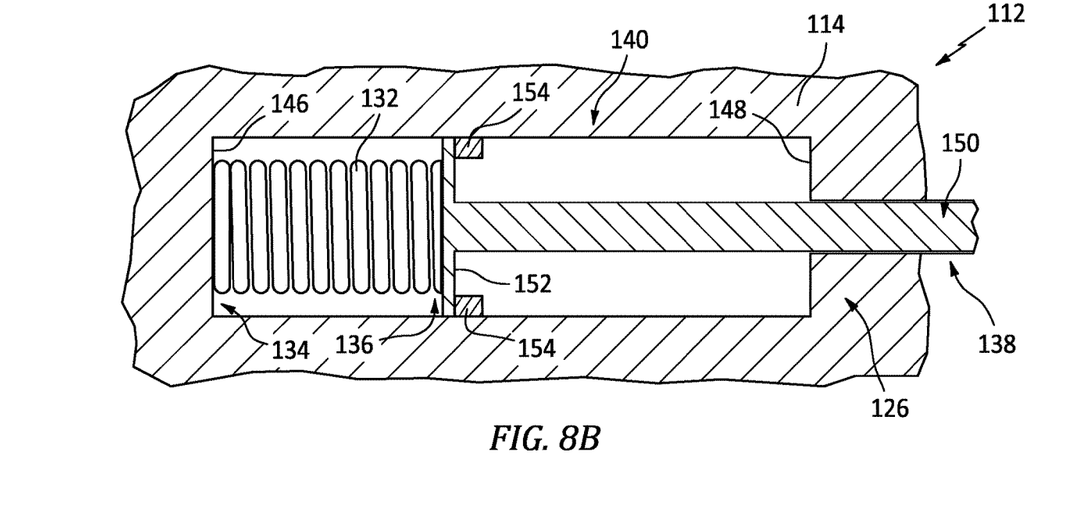

In various embodiments, the second latch member 112 may include a locking pin 150. The locking pin 150 may be disposed within the passage 126 and extend outward from the body 114 at the second end 118. The locking pin 150 may be configured to translate or otherwise move along the latch axis 56 within the passage 126. The locking pin 150 may include a locking member 152 located at a distal end of the locking pin 150 and retained within the second passage segment 140. The locking member 152 may have a size and/or shape to prevent the locking member 152 from being withdrawn into the first passage segment 138.

In various embodiments, the second latch member 112 may include an axially extending spring 132 disposed within the second passage segment 140. The spring 132 has a first axial end 134 and a second axial end 136 opposite the first axial end 134. The first axial end 134 of the spring 132 is disposed proximate and may contact the body 114 of the second latch member 112 at the first axial segment end 146. The second axial end 136 of the spring 132 is disposed proximate and may contact the locking member 152 of the locking pin 150. Accordingly, the spring 132 may be configured for compression between the body 114 and the locking pin 150 and may axially bias the body 114 of the second latch member 112 in a direction away from the locking pin 150.

In various embodiments, the second latch member 112 may include a pin stopper 154 extending radially inward from the body 114 into the second passage segment 140. The pin stopper 154 may be in integral portion of the body 114 or may be a distinct component separately installed into the second passage segment 140. The pin stopper 154 may be located axially between first segment end 146 and the second segment end 148 of the second passage segment 140. The pin stopper 154 may extend around all or a portion of the interior circumference of the second passage segment 140. The pin stopper 154 may project radially inward into the second passage segment 140 a distance sufficient to obstruct axial movement of the locking member 152 but may not substantially impact axial compression or expansion of the spring 132. In various embodiments, the pin stopper 154 may be configured to allow the locking member 152 to pass axially through the pin stopper 154, for example, through twisting engagement of the locking member 152 with the pin stopper 154. The present disclosure is not limited to inclusion of the above-described configuration of the passage 126, spring 132, locking pin 150, and/or pin stopper 154.

While the first housing portion 60 and associated first latch member 84 are described herein as being associated with the first panel half 48 and the second housing portion 62 and associated second latch member 112 are described herein as being associated with the second panel half 50, it should be understood that the latch assembly 54 components of the present disclosure are limited to this particular configuration. As used herein, the term "substantially" with regard to an angular relationship refers to the noted angular relationship +/−10 degrees.

Referring to FIGS. 4, 5, 8A-B, 9A-D, and 10, the present disclosure includes a method 1000 for operating a latch assembly, such as the latch assembly 54. The latch assembly 54 may initially be in an "unlatched condition" with each of the first latch member 84, the rotatable arms 94, and the second latch member 112 in their respective retracted positions as shown, for example, in FIG. 8A. The first and second panel halves 48, 50 may be in a closed condition so that the first housing portion 60 is positioned adjacent the second housing portion 62 along the latch axis 56.

Figure 9A:
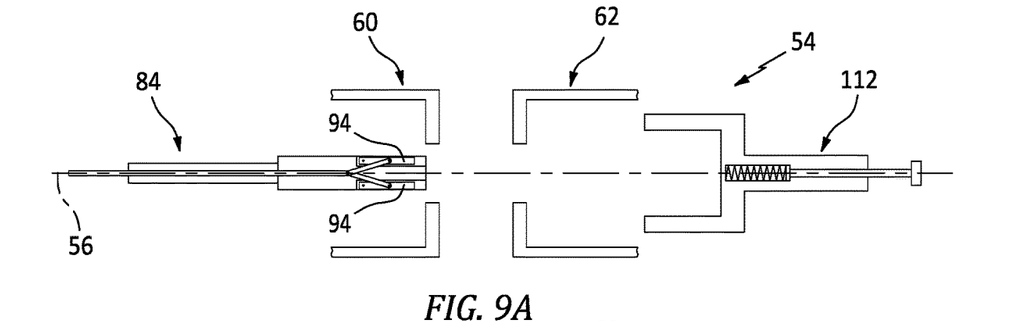
FIGS. 9A-D illustrate an exemplary sequence for positioning the thrust reverser latch assembly of FIG. 6 in a fully latched condition, in accordance with one or more embodiments of the present disclosure.
Figure 9B:
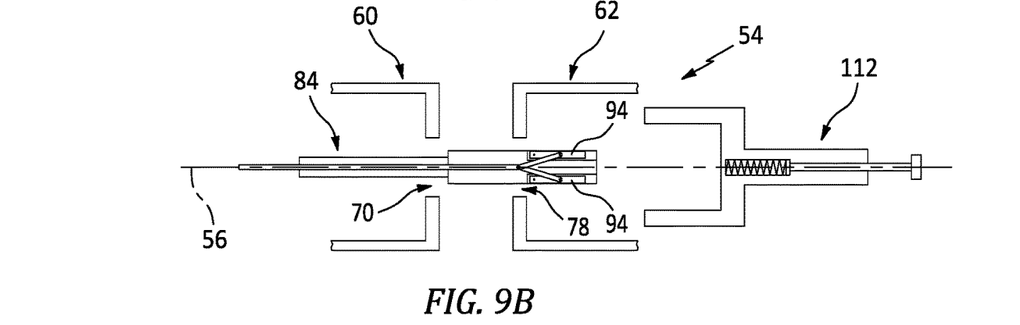

In step 1002, the method 1000 includes translating the first latch member 84 along the latch axis 56 from the retracted position to the extended position (see FIGS. 9A and 9B). In the extended position, the first latch member 84 may extend through the apertures 70, 78 of the respective first housing portion 60 and second housing portion 62. With the first latch member 84 in the extended position, the rotatable arms 94 may be located axially within the second housing portion 62.

Figure 9C:
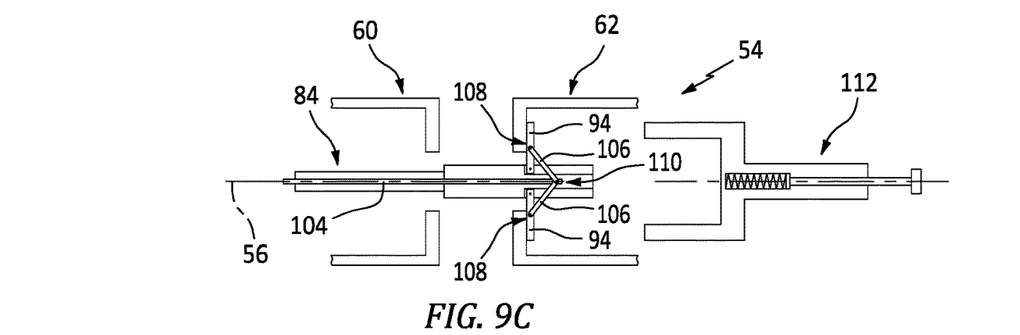

In step 1004, the method 1000 includes rotating the rotatable arms 94 from the retracted position to the extended position (see FIGS. 9B and 9C). In various embodiments, for example, the rotatable arms 94 may be rotated from the retracted position to the extended position by operation of the actuation rod 104. Insertion of the actuation rod 104 into the body 86 causes the connectors 106 about the respective first connector end 108 and second connector end 110, thereby causing the rotatable arms 94 to rotate in a counterclockwise direction from the retracted position to the extended position.

Figure 9D:
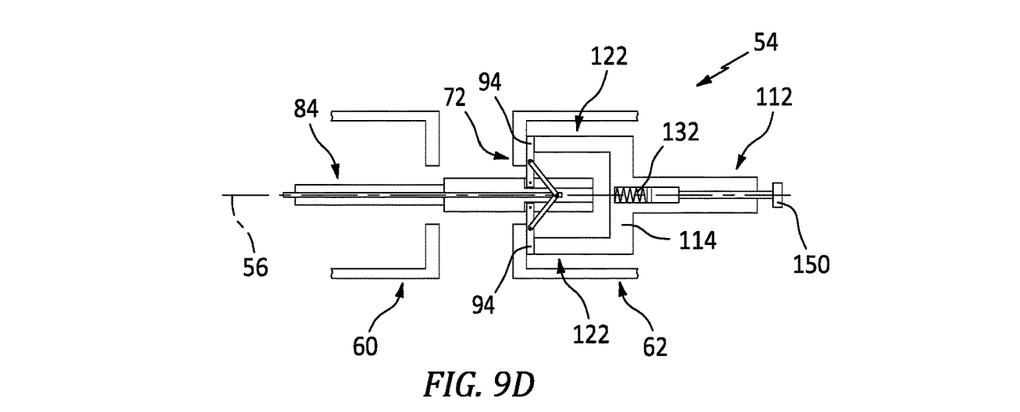

In step 1006, the method 1000 includes translating the second latch member 112 along the latch axis 56 from the retracted position to the extended position (see FIGS. 9C and 9D). In the retracted position, the second latch member 112 may be axially spaced from the rotatable arms 94 of the first latch member 84. With the first latch member 84 and the rotatable arms 94 in their respective extended positions, translation of the second latch member 112 from the retracted position to the extended position will cause the axially extending portions 122 of the second latch member 112 to contact the rotatable arms 94 of the first latch member 84. Thus, the rotatable arms 94 may be in contact with and fixed between the axially extending portions 122 of the second latch member 112 and the interior surface 76 of the lateral wall 72 of the second housing portion 62, as shown in FIG. 9D. In various embodiments, such as those embodiments including the spring 132, continued axial translation of the second latch member 112 toward the first latch member 84 may cause compression of the spring 132 between the body 114 and the locking pin 150. Axial force from the compression of the spring 132 may aid in establishing a desired preload between the first and second latch members 84, 112. With the rotatable arms 94 in contact with and fixed between the axially extending portions 122 of the second latch member 112 and the interior surface 76 of the lateral wall 72, the latch assembly 54 may be considered to be in a "latched condition."

The latch assembly 54 of the present disclosure effects latching, in part, by locking abutting surfaces (e.g., fixing the rotatable arms 94 between the second housing portion 62 and the second latch member 112), and thereby substantially reduces or eliminates the likelihood of jamming in comparison to conventional thrust reverser pin-and-socket latch assemblies of which we are aware. Moreover, the configuration of the latch members 84, 112 for translation and abutment along the latch axis 56 allows the latch assembly 54 to effectively resist both tension loads and compressive loads on the panel halves 48, 50 during operation of the gas turbine engine 20.

Figure 10:
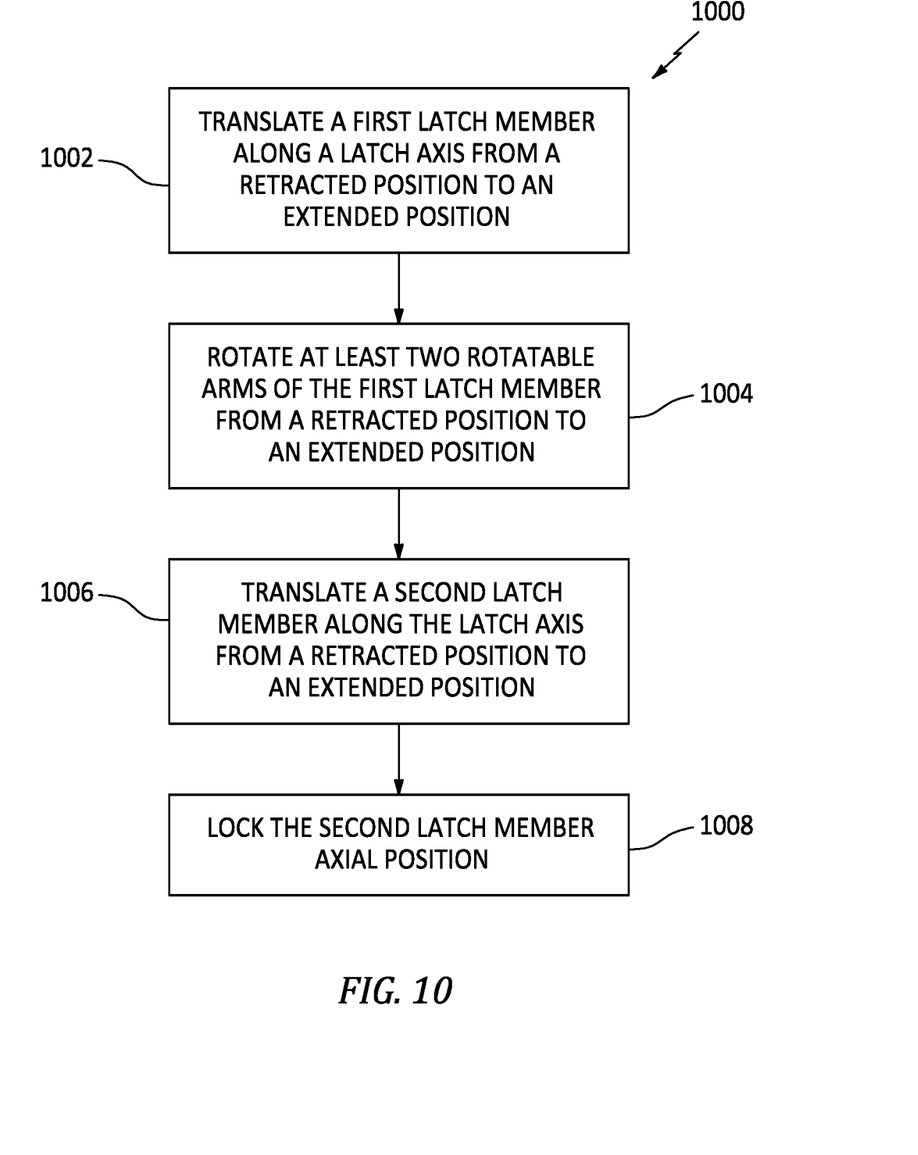
FIG. 10 illustrates a flowchart depicting a method for operating a thrust reverser latch assembly, in accordance with one or more embodiments of the present disclosure.

In step 1008, in various embodiments, the method 1000 may additionally include "locking" the axial position of the second latch member 112. In various embodiments, the axial position of the second latch member 112 may be locked by, for example, engaging the locking pin 150 with the pin stopper 154. For example, the locking pin 150 may be used axially translated along the latch axis 56 in a direction toward the first latch member 84, thereby causing the second latch member 112 to engage the first latch member 84 as described above with respect to step 1006. Continued axial translation of the locking pin 150 may cause compression of the spring 132 until the locking member 152 of the locking pin 150 contacts the pin stopper 154. With the locking member 152 in contact with the pin stopper 154, rotation of the locking pin 150 may cause the locking member 152 to become fixedly engaged with the pin stopper 154, thereby locking the axial position of the second latch member 112. Alternatively, rotation of the locking pin 150 may cause the locking member 152 to pass axially through the pin stopper 154 where the pin stopper 154 may then prevent or otherwise obstruct axial withdrawal of the locking member 152. The present disclosure is not limited to any particular form of engagement between the locking member 152 and the pin stopper 154. With the axial position of the second latch member 112 locked, it should be understood that the compressed condition of the spring 136 may still allow some limited axial movement of the second latch member 112 and may still aid in establishing a desired preload between the first and second latch members 84, 112.

To unlock the axial position of the second latch member 112 or to place the latch assembly 54 in an unlatched condition, the steps of method 1000 described above and as illustrated in FIGS. 8A-B and 9A-D may be performed in a substantially reverse order.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A latch assembly comprising:
a housing including a first housing portion including a first aperture and a second housing portion including a second aperture, each of the first aperture and the second aperture extending along a latch axis, the second housing portion comprising a lateral wall defining the second aperture, the lateral wall including an exterior surface facing the first housing portion and an interior surface facing away from the first housing portion;
a first latch member disposed within the first housing portion and configured for translation along the latch axis, the first latch member including at least two rotatable arms configured to rotate between an arm retracted position and an arm extended position in which the at least two rotatable arms extend in a first direction away from the latch axis; and
a second latch member disposed within the second housing portion and configured for translation along the latch axis, the second latch member including a second latch member body including a base portion and at least one axially extending portion extending from the base portion in a second direction toward the interior surface of the lateral wall, the at least one axially extending portion radially surrounding a recess located along the latch axis.

2. The latch assembly of claim 1, wherein the first latch member is configured to translate along the latch axis between a first retracted position with the at least two rotatable arms located within the first housing portion and a first extended position with the at least two rotatable arms located within the second housing portion.

3. The latch assembly of claim 2, wherein the first latch member extends through the first aperture and the second aperture in the first extended position.

4. The latch assembly of claim 2, wherein with the first latch member in the first extended position and the at least two rotatable arms in the arm extended position, the second latch member is configured to translate along the latch axis between a second retracted position with the at least one axially extending portion axially spaced from the at least two rotatable arms and a second extended position with the at least two rotatable arms in contact with and fixed between the at least one axially extending portion of the second latch member body and the interior surface of the lateral wall.

5. The latch assembly of claim 4, wherein the second latch member includes an axially extending spring disposed within the second latch member body, the axially extending spring configured to axially bias the at least one axially extending portion against the at least two rotatable arms with the second latch member in the second extended position.

6. The latch assembly of claim 5, wherein the second latch member body includes an axially extending passage and a locking pin disposed within the axially extending passage and configured to translate along the latch axis, and wherein the spring is positioned in the axially extending passage axially between the second latch member body and the locking pin.

7. The latch assembly of claim 6, wherein the second latch member body includes a pin stopper located in the axially extending passage, the pin stopper configured to obstruct axial translation of the locking pin within the axially extending passage.

8. The latch assembly of claim 1, wherein the second aperture has a first width substantially perpendicular to the latch axis and the recess has a second width substantially perpendicular to the latch axis which is greater than the first width.

9. The latch assembly of claim 8, wherein with the at least two rotatable arms in the arm extended position, the at least two rotatable arms have a third width substantially perpendicular to the latch axis which is greater than the second width.

10. The latch assembly of claim 8, wherein with the at least two rotatable arms in the arm extended position, the at least two rotatable arms have a third width substantially perpendicular to the latch axis which is greater than the first width.

11. The latch assembly of claim 1, wherein the first latch member includes a first latch member body including an axially extending passage and wherein the at least two rotatable arms are rotatably fixed to the first latch member body at respective pivot joints located radially outside of the axially extending passage.

12. The latch assembly of claim 11, wherein the first latch member includes an actuating rod disposed within the axially extending passage and configured to translate along the latch axis, the actuating rod connected to each rotatable arm of the at least two rotatable arms with at least one connector rotatably mounted to the actuating rod at a first connector end and rotatably mounted to each respective rotatable arm of the at least two rotatable arms at a second connector end.

13. The latch assembly of claim 1, wherein the at least one axially extending portion includes at least two axially extending portions, each axially extending portion of the at least two axially extending portions circumferentially aligned with each respective rotatable arm of the at least two rotatable arms.

14. A thrust reverser system for a gas turbine engine, the thrust reverser system comprising:
a pylon;
a first panel half and a second panel half, each of the first panel half and the second panel half rotatably mounted to the pylon; and
at least one latch assembly configured to secure the first panel half and the second panel half in a closed condition, the at least one latch assembly comprising:
a housing including a first housing portion mounted to the first panel half and including a first aperture and a second housing portion mounted to the second panel half and including a second aperture, each of the first aperture and the second aperture extending along a latch axis, the second housing portion including a lateral wall defining the second aperture, the lateral wall including an exterior surface facing the first housing portion and an interior surface facing away from the first housing portion;

a first latch member disposed within the first housing portion and configured for translation along the latch axis, the first latch member including at least two rotatable arms configured to rotate between an arm retracted position and an arm extended position in which the at least two rotatable arms extend in a first direction away from the latch axis; and a second latch member disposed within the second housing portion and configured for translation along the latch axis, the second latch member including a second latch member body including a base portion and at least one axially extending portion extending from the base portion in a second direction toward the interior surface of the lateral wall, the at least one axially extending portion radially surrounding a recess located along the latch axis.

* * * * *